United States Patent [19]
Chass

[15] 3,663,911
[45] May 16, 1972

[54] VARIABLE SCALE DIFFERENTIAL TRANSFORMER

[72] Inventor: Jacob Chass, Forest Hills, N.Y.

[73] Assignee: Pickering & Company, Inc., Plainview, L. I., N.Y.

[22] Filed: Apr. 22, 1971

[21] Appl. No.: 136,390

[52] U.S. Cl............................................336/132, 336/136
[51] Int. Cl.............................................................H01f 21/06
[58] Field of Search.........................336/130, 132, 136, 133

[56] References Cited

UNITED STATES PATENTS

| | | | |
|---|---|---|---|
| 3,101,462 | 8/1963 | Swainson | 336/136 X |
| 3,197,722 | 7/1965 | Chass | 336/136 X |
| 3,376,533 | 4/1968 | Chass | 336/136 |

Primary Examiner—Thomas J. Kozma
Attorney—Kane, Dalsimer, Kane, Sullivan and Kurucz

[57] ABSTRACT

A variable scale differentiator transformer is provided, including a yoke of magnetic material having two cavities therein. First and second nonmagnetic bobbins, each carrying a primary and secondary winding thereabout are provided in the cavities in axial alignment. The two primary windings are connected in series bucking relationship and the two secondary windings are connected in series aiding relationship. A bore, coaxial with the bobbin, extends through the portion of the yoke separating the cavities and an elongated magnetic core is provided in the bore. Means are also provided for longitudinally adjusting the position of the core to vary the length of the portions of the core extending into each of the cavities.

6 Claims, 3 Drawing Figures

PATENTED MAY 16 1972　　　　　　　　　　　　　　　　3,663,911

INVENTOR
JACOB CHASS
BY
Kane, Dalsimer, Kane, Sullivan & Kurucz
ATTORNEYS 3,663,911

VARIABLE SCALE DIFFERENTIAL TRANSFORMER

BACKGROUND OF THE INVENTION

Differential transformers, such as that described in U. S. Pat. No. 3,376,533, are commonly used as displacement transducers. The input to the transformer is a mechanical displacement of the transformer core and the transformer output is an AC voltage proportional to the mechanical displacement.

An error which effects the accuracy of absolute displacement measurement by means of such a differential transformer is the sensitivity or scale factor. This end becomes particularly important where, for one reason or another, a particular differential transformer must be removed and replaced by another similar transformer. In that case, unless the scale factors of the original transformer and replacement transformer are identical, different output voltages will result for the same displacement.

In view of the above, it is the principal object of the present invention to provide a differential transformer adapted to be utilized to adjust the scale factor or sensitivity of another differential transformer, the latter being designed to measure linear displacement.

A related object is to provide such an adjusting transformer in a form that may conveniently be packaged in the same envelope as the transformer to be adjusted.

SUMMARY OF THE INVENTION

The above and other beneficial objects and advantages are attained in accordance with the present invention by providing a differential transformer for making sensitivity adjustments of a linear variable differential transformer comprising a yoke of magnetic material, including a base member and three spaced-apart flanges extending transverse to the base member. First and second bobbins of nonmagnetic, nonconductive material are seated in axial alignment in the spaces defined between the flange members. A primary and a secondary winding is wound about each of the bobbins and the primary windings are connected to one another in series bucking relationship and the secondary windings are connected to one another in series aiding relationship. A bore extends through the flange separating the bobbins in axial alignment with the bobbins. A core of magnetic material extends through the flange bore partially into each of the bobbins. The core is longitudinally adjustable within the bore and means are provided for locking the core at any desired location.

The present adjustable differential transformer is designed to be cascaded to the output of a linear variable differential transformer and, by adjusting the position of the core member, the contribution of scale factor error to the total error of the LVDT can be reduced significantly and virtually eliminated so as to make a combined adjustable differential transformer and measuring transformer completely replaceable for another measuring transformer.

DETAILED DESCRIPTION OF THE PREFERRED EMBODIMENT

Figure 1:
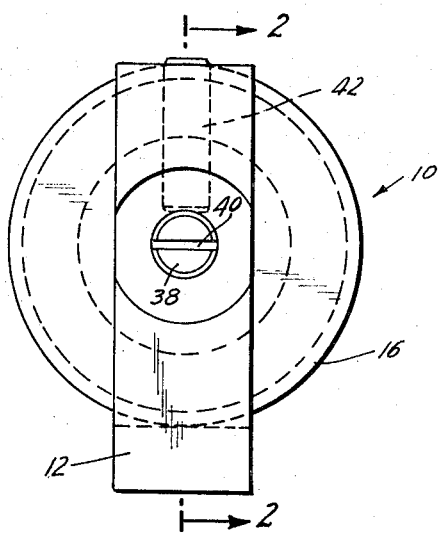
FIG. 1 is an end view of a differential transformer in accordance with the present invention.
Figure 2:
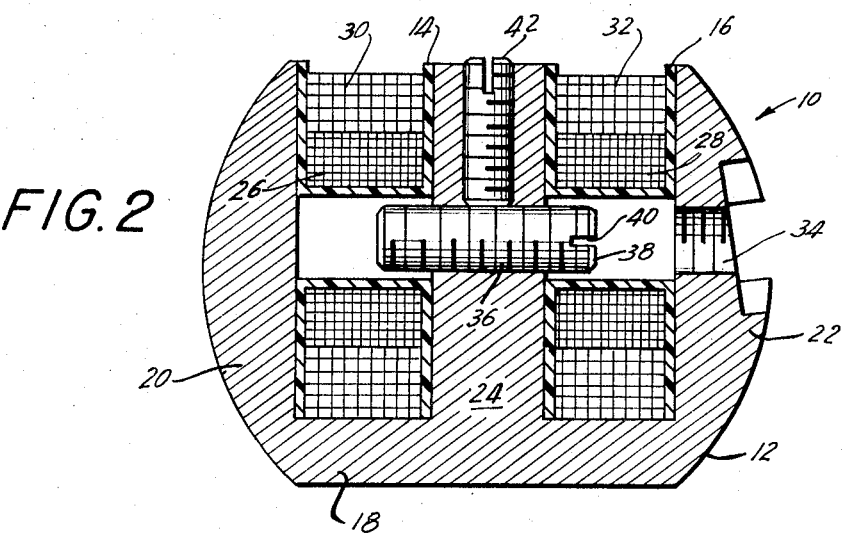
FIG. 2 is a side elevational sectional view taken along reference lines 2—2 of FIG. 1 in the direction indicated by the arrows.

The present differential transformer is illustrated in the accompanying drawings wherein similar components bear the same reference numeral throughout the several views. Reference is first made to FIGS. 1 and 2 wherein a differential transformer 10, constructed in accordance with the teachings of the present invention, is shown comprising an elongated yoke 12 and a pair of coiled bobbins 14 and 16. The yoke 12 is formed of a highly permeable magnetic material such as HY-MU-80 and consists of a base 18, a first end flange 20, a second end flange 22, and an intermediate flange 24 positioned between the end flanges. Each of the flanges 20, 22 and 24 extends generally transverse to the plane of base 18 with the intermediate flange spaced equally distant from the end flanges to define two slots or cavities, each cavity defined between the intermediate flange and one of the end flanges.

Bobbin 14 is positioned between end flange 20 and intermediate flange 24 and bobbin 16 is positioned between intermediate flange 24 and end flange 22. The bobbins are each formed of a nonmagnetic, nonconductive material, such as a plastic or ceramic. First and second secondary coils 26 and 28 of the same electrically conductive insulated wire are respectively wound about bobbins 14 and 16 and connected to each other in series aiding arrangement. First and second primary coils 30 and 32 of the same electrically conductive insulated wire are wound over the entire length of the first and second secondary coils and insulated therefrom. The primary coils are connected to each other in series bucking arrangement. The length of bobbins 14 and 16 are the same and each of the coils has a uniform number of turns per unit length with the number of turns of both primary coils being equal and the number of turns of both secondary coils being equal.

A threaded bore 34 extends through flanges 22 and 24 of yoke 12 coaxial with bores extending through bobbins 14 and 16. An elongated threaded rod or core 36 is threadedly positioned within bore 34 and has portions extending into each of the bobbin bores. Core 36 is formed of the same magnetic material as yoke 12. End 38 of core 36 is provided with a screwdriver slot 40 which is accessible through the bore in end flange 22 so that the position of the core may be altered with a screwdriver passed through flange 22.

An additional bore extends through flange 24 transverse to and in registry with bore 34. A nonmagnetic screw 42 passes through this bore and is designed to engage core 36 so that by sufficiently tightening screw 42, core 36 may be prevented from moving, even under severe shock conditions.

In operation, when an input current is placed across primary coils 30 and 32 by the application of a voltage between terminals 44 and 46, it will generate a magnetic flux dependent upon the difference between the length of the portion of core 36 that extends into bobbin 14 and the length of the portion of core 36 that extends into bobbin 16 since the primary coils 30 and 32 are connected in series opposition. The resultant flux will induce a voltage across secondary coils 26 and 28 which may be read between output terminals 48 and 51. Thus, if core 36 were positioned centrally between bobbins 14 and 16, there would be substantially zero output, if the core were positioned wholly within one bobbin, the read-out would be determined by the ratio of the secondary windings to the primary windings, and any intermediate value could be obtained by suitable positioning the core 36 in an intermediate position. The input coils 30 and 32 (rather than the output coils) are connected in series opposition to increase the efficiency of the transformer by causing the inductive components of the input load to cancel out, leaving an almost purely resistive input load.

As was previously mentioned, a principal use for the differential transformer of the present invention is to alter the scale factor or sensitivity of another differential transformer which, in turn, is used to determine and measure displacement. A typical differential transformer with which the present differential transformer may be utilized is that illustrated and described in U. S. Pat. No. 3,376,533 which, as set forth in the referenced patent, may be used to determine position as a function of output voltage.

Figure 3:
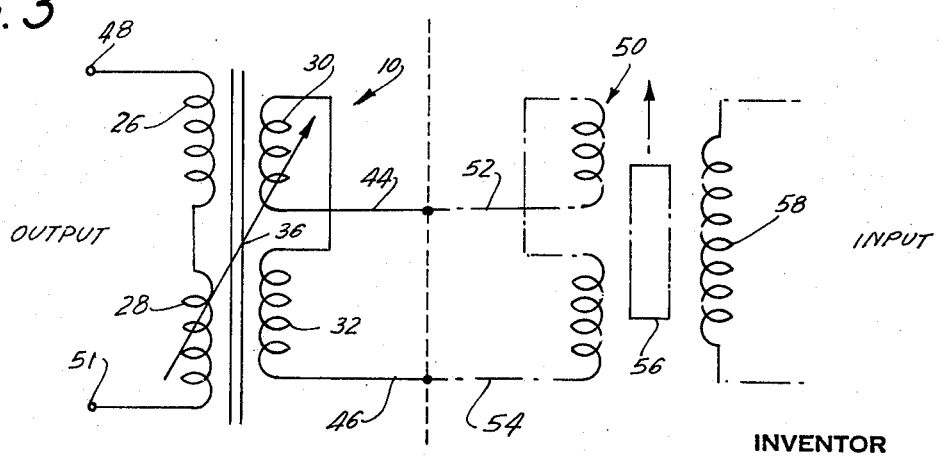
FIG. 3 is a circuit diagram of the present differential transformer shown cascaded to a linear variable differential transformer, the output of which is to be adjusted.

In FIG. 3, a schematic representation of the differential transformer 50 of U. S. Pat. No. 3,376,533 is illustrated cascaded to the differential transformer 10 of the present invention. As described in that patent, the output voltage measured across terminals 52 and 54 is a linear function of the displacement of core 56 when an input AC current is applied across primary winding 58. When the present differential transformer 10 is cascaded to differential transformer 50, the input to the present differential transformer comprises the output of the measuring transformer 50. The output of the present transformer is the output of the measuring transformer adjusted by a scale factor introduced by virtue of the position of core 36. This could range between zero when the core is centrally located to a factor determined by the ratio of the number of turns of the secondary winding to the number of turns of the primary windings.

It should be apparent that if the present differential transformer 10 were packaged in a single unit with a measuring transformer such as differential transformer 50 the sensitivity of the entire unit could be adjusted by adjusting the core position of the present transformer so that the single unit could serve a wide range of uses with differing voltage requirements.

Having thus described the invention, what is claimed is:

1. A differential transformer comprising: a yoke of magnetic material, said yoke including an elongated base member, a first end flange extending generally transverse to said base member, a second end flange extending transverse to said base member and a third flange extending transverse to said base member interposed between said first and second end flanges, said first and third flange defining a first cavity therebetween and said second and third flanges defining a second cavity therebetween; first and second bobbins of nonmagnetic, nonconductive material seated in axial alignment in said first and second cavities respectively; first and second secondary windings of electrically conductive wire wound about said first and second bobbins respectively; first and second primary windings of electrically conductive wire wound about said first and second bobbins respectively coaxial with the respective secondary windings and electrically insulated therefrom; said primary windings being connected to one another in series opposition and said secondary windings being connected to one another in series aiding relationship; a bore extending through said third flange and said bobbins coaxial with said bobbins; an elongated core of magnetic material positioned for longitudinal movement within said bore, said core having a length greater than the width of said third flange whereby end portions of said core can simultaneously extend into said first and second cavities; and means for adjusting the position of said core.

2. The invention in accordance with claim 1 wherein said first and second primary windings are formed of identical wire and have an equal number of turns and said first and second secondary windings are formed of identical wire and have an equal number of turns.

3. The invention in accordance with claim 2 wherein each of said windings has a uniform number of turns per unit length over the entire length of its associated bobbin.

4. The invention in accordance with claim 1 wherein said first and second primary windings are wound over the first and second secondary windings respectively.

5. The invention in accordance with claim 1 wherein said bore is threaded and extends through at least one of said end flanges and said core means comprises a threaded rod adapted to threadedly engage said bore whereby adjustment of the position of the core can be made by threadedly engaging said core through said one end flange.

6. The invention in accordance with claim 5 further comprising a second threaded bore extending through said third flange transverse to and aligned with said first bore and screw means of nonmagnetic material extending through said second bore and adapted to bear against said core whereby to prevent longitudinal movement of said core within said first bore.

* * * * *